(12) United States Patent
Ghebremusse et al.

(10) Patent No.: US 12,277,738 B2
(45) Date of Patent: Apr. 15, 2025

(54) METHOD AND SYSTEM FOR LATENT-SPACE FACIAL FEATURE EDITING IN DEEP LEARNING BASED FACE SWAPPING

(71) Applicants: LUCASFILM ENTERTAINMENT COMPANY LTD. LLC, San Francisco, CA (US); DISNEY ENTERPRISES, INC, Burbank, CA (US)

(72) Inventors: Sirak Ghebremusse, San Francisco, CA (US); Stéphane Grabli, San Francisco, CA (US); Jacek Krzysztof Naruniec, Zürich (CH); Romann Matthew Weber, Zürich (CH); Christopher Richard Schroers, Zürich (CH)

(73) Assignees: Lucasfilm Entertainment Company Ltd. LLC, San Francisco, CA (US); Disney Enterprises, Inc., Burbank, CA (US)

( * ) Notice: Subject to any disclaimer, the term of this patent is extended or adjusted under 35 U.S.C. 154(b) by 221 days.

(21) Appl. No.: 17/707,782

(22) Filed: Mar. 29, 2022

(65) Prior Publication Data
US 2023/0316587 A1    Oct. 5, 2023

(51) Int. Cl.
  *G06T 9/00*  (2006.01)
  *G06T 7/70*  (2017.01)
  (Continued)

(52) U.S. Cl.
  CPC .............. *G06T 9/002* (2013.01); *G06T 7/70* (2017.01); *G06T 11/00* (2013.01); *G06V 40/168* (2022.01);
  (Continued)

(58) Field of Classification Search
  CPC .................. G06T 9/002; G06T 2207/30201
  See application file for complete search history.

(56) References Cited

U.S. PATENT DOCUMENTS

| 10,902,571 B2 | 1/2021 | Naruniec et al. |
| 11,222,466 B1 * | 1/2022 | Naruniec ................ G06T 15/04 |

(Continued)

FOREIGN PATENT DOCUMENTS

| CN | 112766160 A | 5/2021 |
| CN | 113420703 A | 9/2021 |

(Continued)

OTHER PUBLICATIONS

Zeng, et al., "Facial Expression Transfer from Video via Deep Learning", SCA '21: The ACM SIGGRAPH / Eurographics Symposium on Computer Animation, Sep. 6-9, 2021, 2 pages.

(Continued)

*Primary Examiner* — Matthew Salvucci
(74) *Attorney, Agent, or Firm* — Kilpatrick Townsend & Stockton LLP

(57) ABSTRACT

A computer-implemented method of changing a face within an output image or video frame that includes: receiving an input image that includes a face presenting a facial expression in a pose; processing the image with a neural network encoder to generate a latent space point that is an encoded representation of the image; decoding the latent space point to generate an initial output image in accordance with a desired facial identity but with the facial expression and pose of the face in the input image; identifying a feature of the facial expression in the initial output image to edit; applying an adjustment vector to a latent space point corresponding to the initial output image to generate an adjusted latent space point; and decoding the adjusted latent space point to generate an adjusted output image in accordance with the desired facial identity but with the facial (Continued)

expression and pose of the face in the input image altered in accordance with the adjustment vector.

22 Claims, 9 Drawing Sheets

(51) Int. Cl.
*G06T 11/00* (2006.01)
*G06V 40/16* (2022.01)

(52) U.S. Cl.
CPC .............. *G06T 2200/24* (2013.01); *G06T 2207/10016* (2013.01); *G06T 2207/20081* (2013.01); *G06T 2207/20084* (2013.01); *G06T 2207/20092* (2013.01); *G06T 2207/30201* (2013.01)

(56) References Cited

U.S. PATENT DOCUMENTS

| 11,308,657 | B1 | 4/2022 | Berlin et al. |
| 2017/0076142 | A1 | 3/2017 | Chang |
| 2019/0251707 | A1 | 8/2019 | Gupta et al. |
| 2021/0142440 | A1 | 5/2021 | Ahn et al. |
| 2021/0192684 | A1 | 6/2021 | Pardeshi et al. |
| 2021/0295483 | A1 | 9/2021 | Huang et al. |
| 2021/0327038 | A1 | 10/2021 | Helminger et al. |
| 2022/0036534 | A1 | 2/2022 | Chakrabarty et al. |
| 2022/0374649 | A1 | 11/2022 | Naruniec et al. |
| 2022/0391611 | A1* | 12/2022 | Kalarot .............. G06N 3/09 |
| 2023/0049729 | A1 | 2/2023 | Berlin et al. |
| 2023/0086807 | A1 | 3/2023 | Lukác et al. |
| 2023/0162407 | A1* | 5/2023 | Kalarot .............. G06V 40/168 382/118 |

FOREIGN PATENT DOCUMENTS

| CN | 113592982 A | 11/2021 |
| JP | 2021000224 A | 1/2021 |
| KR | 20210033781 A | 3/2021 |

OTHER PUBLICATIONS

U.S. Appl. No. 17/707,785, "Non-Final Office Action", Jun. 13, 2024, 24 pages.

U.S. Appl. No. 17/707,785, "Final Office Action", Nov. 29, 2024, 27 pages.

Xu, et al., "Face Shape Gene: A Disentangled Shape Representation for Flexible Face Image Editing", Computer Science, Computer Vision and Pattern Recognition Available online at : https://arxiv.org/abs/1905.01920, May 6, 2019, 10 pages.

* cited by examiner

METHOD AND SYSTEM FOR LATENT-SPACE FACIAL FEATURE EDITING IN DEEP LEARNING BASED FACE SWAPPING

CROSS REFERENCE TO RELATED APPLICATIONS

This application is related to concurrently filed U.S. patent application Ser. No. 17/707,785 for "METHOD AND SYSTEM FOR DEEP LEARNING BASED FACE SWAPPING WITH MULTIPLE ENCODERS" filed on Mar. 29, 2022, the disclosure of which is hereby incorporated by reference in its entirety for all purposes.

BACKGROUND OF THE INVENTION

Face swapping is the process of replacing an actor's face in a plate with another person's face. In visual effects, face swapping is desirable for many creative goals, like replacing the face of a stunt double with that of the main actor or to achieve de-aging by swapping the face of a present-day actor with a younger looking face learned on archival footage. In the recent past, face-swapping techniques based on deep learning have become popular and are starting to see adoption for high quality visual effects production. These techniques typically employ encoder-decoder neural networks where the encoder ingests images of the actor to be replaced (e.g. the stunt double) and outputs a "latent space point" (a lower-dimensional abstract representation of that input data). An identity-specific decoder can then transform this latent space point back into an image in which the stunt double's face is replaced with the main actor's face.

While some currently available deep-learning face swapping techniques can do a good job at translating the facial expression of a source actor (e.g., stunt double) to target character in many instances, improvements in this regard are continuously being sought. In particular, one challenge with many deep learning techniques is the lack of control over the swapped image. For example, the eye gaze in the replaced face might be slightly off and there is no clear, easy way to correct the eye gaze direction.

BRIEF SUMMARY OF THE INVENTION

Embodiments set forth in the present disclosure are directed to methods and systems for performing face swapping. Embodiments of the present disclosure enable face swapping to be performed with a high degree of accuracy and can generate high resolution output images that are sufficient to use in the generation of film-production quality images and videos. In some embodiments, a progressively trained, multi-way neural network is provided. The network can embed input faces in a shared latent space and can decode the embedded faces as an output face selected from any of the various different facial identity options supported by the network while maintaining the facial expression of the input face.

In some embodiments, instead of a single encoder that encodes the entire input image, the neural network includes multiple encoders that encode different parts of an input image into separate latent space vectors representative of each part. When concatenated together, the separate latent space vectors represent the entire image. By providing multiple, separate encoders for different portions of a single image, embodiments can enable expressions of an output image generated by a decoder to be more faithful to the original expression in the input image in some instances than when a single encoder is employed to encode the entirety of the input image.

In some embodiments, the neural network includes an editing capability in which a latent space point generated by the encoder can be edited to achieve a desired alteration to the facial swap output. If edits to the facial expression in an output image are desired, such embodiments allow the alterations to be performed with less labor by filmmakers and digital artists than some other face swapping techniques.

In some embodiments, a computer-implemented method of changing a face within an output image or video frame includes: receiving an input image that includes a face presenting a facial expression in a pose; separately encoding different portions of the image by, for each separately encoded portion, generating a latent space point of the portion, thereby generating a plurality of multi-dimensional vectors where each multi-dimensional vector is an encoded representation of a different portion of the input image; concatenating the plurality of multi-dimensional vectors into a combined latent space vector; and decoding the combined latent space vector to generate the output image in accordance with a desired facial identity but with the facial expression and pose of the face in the input image.

Various implementations of the method can include one or more of the following features or additional steps. After receiving the input image and prior to separately encoding, identifying different features within the image that correlate to the different portions of the image. Normalizing the input image prior to the receiving step. Resizing the input image prior to the receiving step. For each of the different features identified, extracting, from the input image, an image segment that comprises the identified feature thereby generating a plurality of image segments. Each of the image segments can be a predetermined size. Incorporating the output image into one or more of a movie, a video, a video game or virtual or augmented reality content.

In some specific implementations, the plurality of image segments can include: a first image segment that contains a portion of the input image with a left eye of the face, a second image segment that contains a portion of the input image with a right eye of the face, a third image segment that contains a portion of the input image with a mouth of the face, and a fourth image segment that contains a remaining portion of the input image not included in the first, second or third image segments. Each of the first, second, third and fourth image segments can comprise a predetermined size. The separately encoding step can comprise generating a first latent space point of a left eye of the face in the input image, generating a second latent space point of a right eye of the face in the input image, generating a third latent space point of a mouth of the face in the input image and generating a fourth latent space point of a remaining portion of the face in the input image. The concatenating step can include concatenating the first, second, third and fourth latent space points into the combined latent space vector.

In some embodiments, a computer-implemented method of changing a face within an output image or video frame includes: receiving an input image that includes a face presenting a facial expression in a pose; processing the image with a neural network encoder to generate a latent space point that is an encoded representation of the image; decoding the latent space point to generate an initial output image in accordance with a desired facial identity but with the facial expression and pose of the face in the input image; identifying a feature of the facial expression in the initial output image to edit; applying an adjustment vector to a latent space point corresponding to the initial output image to generate an adjusted latent space point; and decoding the adjusted latent space point to generate an adjusted output image in accordance with the desired facial identity but with the facial expression and pose of the face in the input image altered in accordance with the adjustment vector.

Various implementations of the method can include one or more of the following features or additional steps. Repeating the steps of applying an adjustment vector to the latent space point corresponding to the initial output image to generate an adjusted latent space point and decoding the adjusted space point to generate an adjusted output image until the adjusted output image has the desired facial expression. The adjustment vector can be generated from a plurality of key poses from selected images having a facial expression with a selected trait. The adjustment vector can be generated from a plurality of key poses from selected images having a facial expression with a selected trait and the method can include calculating latent space points for the selected images, and generating the adjustment vectors by computing differences between an average of latent space points for the selected images and a neutral latent space point. The neural network is trained to be identity agnostic. The input image is normalized prior to the receiving step. The input image is resized to a predetermined size prior to the receiving step. A user can select one or more features in the initial output image to adjust via a user interface. The user interface can include a slider that allows the user to control a weighting of the adjustment vector that is applied to the latent space point corresponding to the initial output image. The output image can be incorporated into one or more of a movie, a video, a video game or virtual or augmented reality content.

Some embodiments pertain to a non-transitory computer-readable medium that stores instructions for performing any of the above methods. And, additional embodiments pertain to a computer system that includes one or more processors that execute such computer-readable instructions to perform any of the above methods.

These and other embodiments are described in the following detailed description and the accompanying drawings. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

Illustrative embodiments of the present disclosure are described in detail below with reference to the following drawing figures.

DETAILED DESCRIPTION OF THE INVENTION

In the following description, for the purposes of explanation, specific details are set forth in order to provide a thorough understanding of embodiments of the present disclosure. However, it will be apparent that various embodiments can be practiced without these specific details. The figures and description are not intended to be restrictive. The ensuing description provides exemplary embodiments only, and is not intended to limit the scope, applicability, or configuration of the disclosure. Rather, the ensuing description of exemplary embodiments will provide those skilled in the art with an enabling description for implementing an exemplary embodiment. It should be understood that various changes can be made in the function and arrangement of elements without departing from the spirit and scope of the present disclosure as set forth in the appended claims.

Embodiments set forth below are directed to deep learning methods and systems for swapping a face in a source image with a face in a target image. Embodiments of the present disclosure enable such face swapping to be performed with a high degree of accuracy and with high resolution images. Thus, embodiments disclosed herein enable the generation of film-production quality images and videos. As described below, in some embodiments a progressively trained, neural network, such as a comb network, is provided. The network can embed input faces in a shared latent space and can decode the embedded faces as an output face selected from any of the various different facial identity options supported by the network while maintaining the facial expression of the input face. Some embodiments separately encode different parts of an input image enabling expressions of an output image generated by the system to be highly faithful to the original expression in the input image, and some embodiments allow an end-user to revise or otherwise edit one or more aspects of the facial expression in the output face in a relatively easy and efficient manner.

I. Deep Learning System Architecture

Figure 1A:
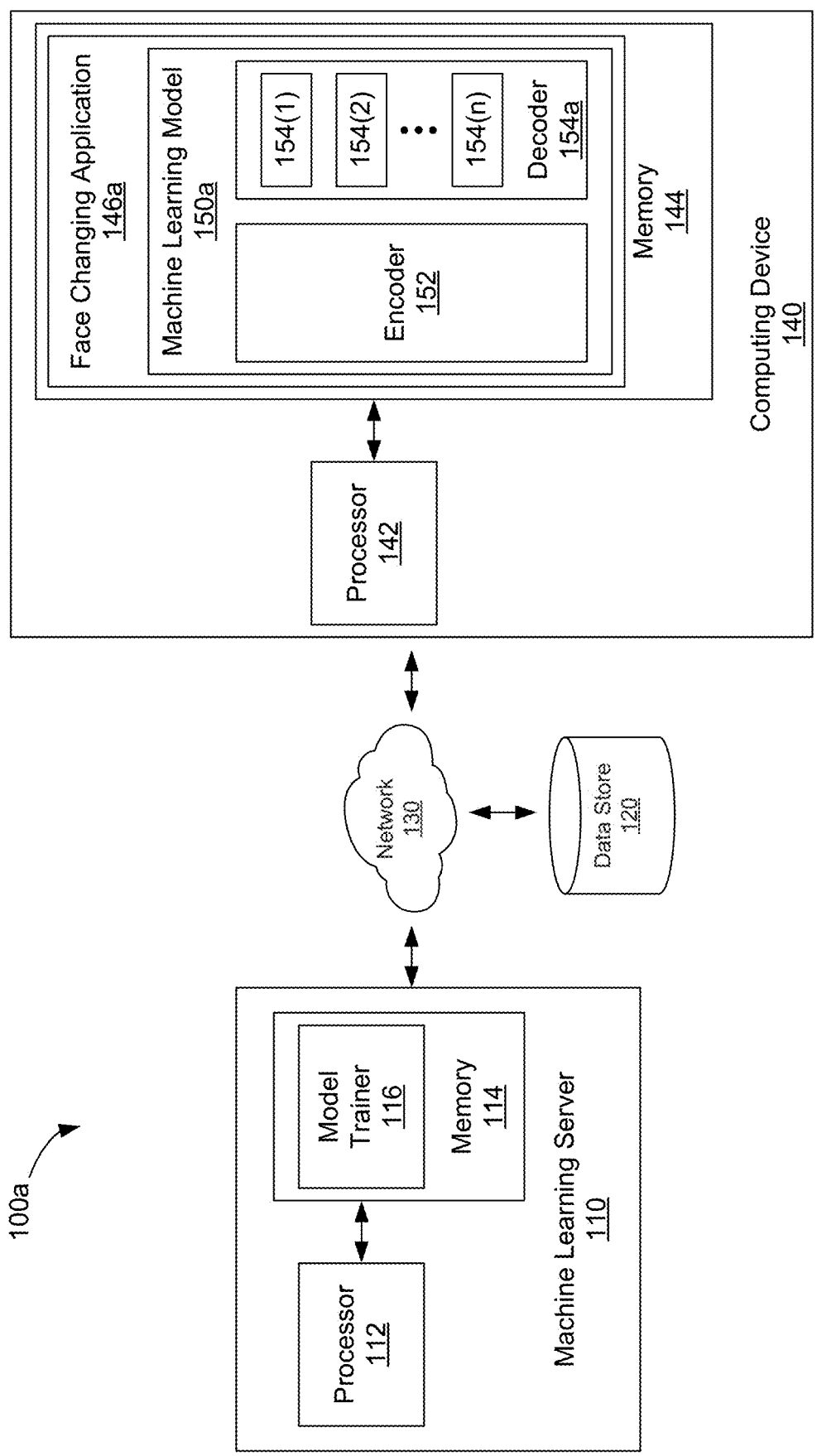
FIG. 1A is a simplified block diagram of a deep learning system according to some embodiments.

In order to better understand and appreciate embodiments described herein, reference is first made to FIG. 1A, which is a simplified block diagram of a system 100*a* according to some embodiments. As shown, system 100*a* includes a machine learning server 110, a data store 120, and a computing device 140 in communication over a network 130, which can be a wide area network (WAN) such as the Internet, a local area network (LAN), or any other suitable network. Machine learning server 110 can include a processor 112, a system memory 114 and a model trainer 116. The model trainer 116 executes on processor 112 and can be stored in system memory 114. The processor 112 can receive user input from input devices (not shown), such as a keyboard or a mouse. In operation, the processor 112 is the master processor of the machine learning server 110, controlling and coordinating operations of various system components. In particular, processor 112 can issue commands that control the operation of a graphics processing unit (GPU) that incorporates circuitry optimized for graphics and video processing, including for example, video output circuitry. The GPU can deliver pixels to a display device that can be any conventional or appropriate display, such as a cathode ray tube display, a liquid crystal display, a light-emitting diode display, or the like.

System memory 114 can store content, such as software applications and data, for use by processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing or other suitable memory components. In some embodiments, a computer-readable storage unit (not shown) can supplement or replace the computer-readable system memory 114. The computer-readable storage unit can include any number and type of external memories that are accessible to the processor 112 and/or the GPU. For example, and without limitation, the storage unit can include a Secure Digital Card, an external Flash memory, a portable compact disc read-only memory (CD-ROM), an optical storage device, a magnetic storage device, or any suitable combination of the foregoing or other suitable storage devices.

It will be appreciated that machine learning server 110 is illustrative and that variations and modifications are possible. For example, the number of processors 112, the number of GPUs, the number of system memories 114, and the number of applications included in system memory 114 can vary or be modified as desired. Further, the connection topology between the various units in FIG. 1A can be modified as desired. In some embodiments, any combination of processor 112, system memory 114, and a GPU can be replaced with any type of virtual computing system, distributed computing system, or cloud computing environment, such as a public, private, or a hybrid cloud.

Model trainer 116 is configured to train machine learning models, including a machine learning (ML) model 150a that can be used to swap the identities of faces in images. Example architectures of the ML model 150a, as well as techniques for training the same, are discussed in greater detail below.

As shown, ML model 150a includes an encoder 152 and a decoder 154a. The encoder 152 and the decoder 154a can be any technically feasible type of encoder and decoder, respectively. In some embodiments, encoder 152 can be an encoder of an autoencoder, and decoder 154a can be a decoder of the autoencoder. Operation(s) performed by encoder 152 to encode an image into a latent space point (i.e., a representation of compressed data in which similar data points are closer together in space) are sometimes referred to herein as "encoding operation(s)." Operation(s) performed to generate an output image from a latent space using decoder 154a are sometimes referred to herein as "decoding operation(s)."

As discussed in greater detail below, encoder 152 can take as input a two-dimensional (2D) image that includes a face and that has been normalized. For example, the image could be a high-definition (HD) resolution image, such as an image having a megapixel resolution, including a face that has been normalized. As used herein, normalization refers to an alignment procedure that fits landmarks on a face appearing in an image to match landmarks of a generic face with a neutral expression. As a result, facial features such as the eyes, nose, etc. are at similar locations within normalized images that are input into encoder 152, which can improve training of the ML model 150a. In embodiments, an image can be normalized in any technically-feasible manner, including using face alignment techniques to compute an affine transformation that rotates, scales, translates, etc. the image, and/or cropping the image. An affine transformation is a linear mapping that preserves points, straight lines, and planes. For example, in some embodiments, normalizing an image includes detecting a largest face in the image and determining the locations of facial landmarks using a modified Deep Alignment Network (DAN). In such cases, the image is then rotated and scaled so that the eyes of the largest face lie on a predefined horizontal line and have a predefined ocular distance. The image can then be cropped and resized to a predetermined size, e.g., 1024×1024 pixels.

Given a normalized image that includes a face, encoder 152 can perform an encoding operation that outputs an encoded representation of the normalized image, which is also referred to herein as a "latent space point" of the normalized image. The latent space point can be a most compressed version of the normalized image generated by encoder 152. Encoder 152 can learn to generate such a latent space point during training and can also generate such a latent decoding from previously unseen data. Decoder 154a can then take as input the latent space point output by encoder 152 and perform a decoding operation that outputs a 2D image including a face. The image that is output by decoder 154a can include a different facial identity, i.e., be a face swap in which the facial identity going into the encoder 152 differs from the facial identity assignment of the decoder 154a. Even though decoder 154a can change the facial identity appearing in an image, the performance of the face in the image, including the facial expression and pose, are not changed by the decoder 154a. For example, given an input image that includes an individual who is smiling and rotated in a particular direction, decoder 154a can generate an output image in which a different individual is smiling and rotated in the same direction.

As shown in FIG. 1A, decoder 154a can include multiple, separate decoders 154(1), 154(2) to 154(n) where each of the separate decoders can correspond to a different facial identity or sometimes to the same facial identity in different lighting conditions. The latent space point generated by encoder 152 can be selectively provided as an input to any one of the decoders 154(1) to 154(n). The selected decoder can then generate and output a 2D pixel-space image of its associated facial identity with the facial expression and pose of the face in the input image. Further details of some embodiments of encoder 152 and decoder 154a are set forth in U.S. Pat. No. 10,902,571, entitled "Automated Image Synthesis using a Comb Neural Network Architecture", which is hereby incorporated by reference in its entirety for all purposes.

Training data and/or trained machine learning models, including ML model 150a, can be stored in the data store 120 and deployed in any suitable application, such as a face changing application 146a. In some embodiments, the training data includes videos in which multiple facial identities appear under similar environmental and lighting conditions. For example, the environmental conditions can include the same setup, with the same background behind individuals who are recorded in the videos. In addition, frames in which faces are partially covered, or blurred due to motion, can be removed. In some embodiments, ML model 150a can be trained using progressive training techniques that minimize reconstruction loss, as described in greater detail U.S. Pat. No. 10,902,571 referenced above. Notably, such training can be self-supervised, in contrast to the supervised training used to train conventional neural network models, and the self-supervised training can also require less training data. In some embodiments, data store 120 can include any storage device or devices, such as fixed disk drive(s), flash drive(s), optical storage, network attached storage (NAS), and/or a storage area-network (SAN). Although shown as accessible over the network 130, in some embodiments the machine learning server 110 can include the data store 120.

Illustratively, face changing application 146a is stored in a computer-readable memory 144 and executes on a processor 142 of computing device 140. Components of computing device 140, including memory 144 and processor 142, can be similar to corresponding components of machine learning server 110. As shown, face changing application 146a includes machine learning (ML) model 150a. More generally, ML model 150a can be deployed to any suitable application or applications. For example, face changing application 146a could be a face-swapping application that changes the facial identities appearing in stand-alone images or the frames of a video using ML model 150a. As another example, face changing application 146a could be an application that blends a computer-generated (CG) performance of a character with a matching performance by an individual using ML model 150a.

While FIG. 1A depicts a single machine learning server 110 and a single computing device 140, the number of machine learning servers and computing devices can be modified as appropriate and desired. Further, the functionality included in any of the applications described with respect to FIG. 1A can be divided across any number of applications or other software that are stored and execute via any number of devices that are located in any number of physical locations.

Figure 1B:
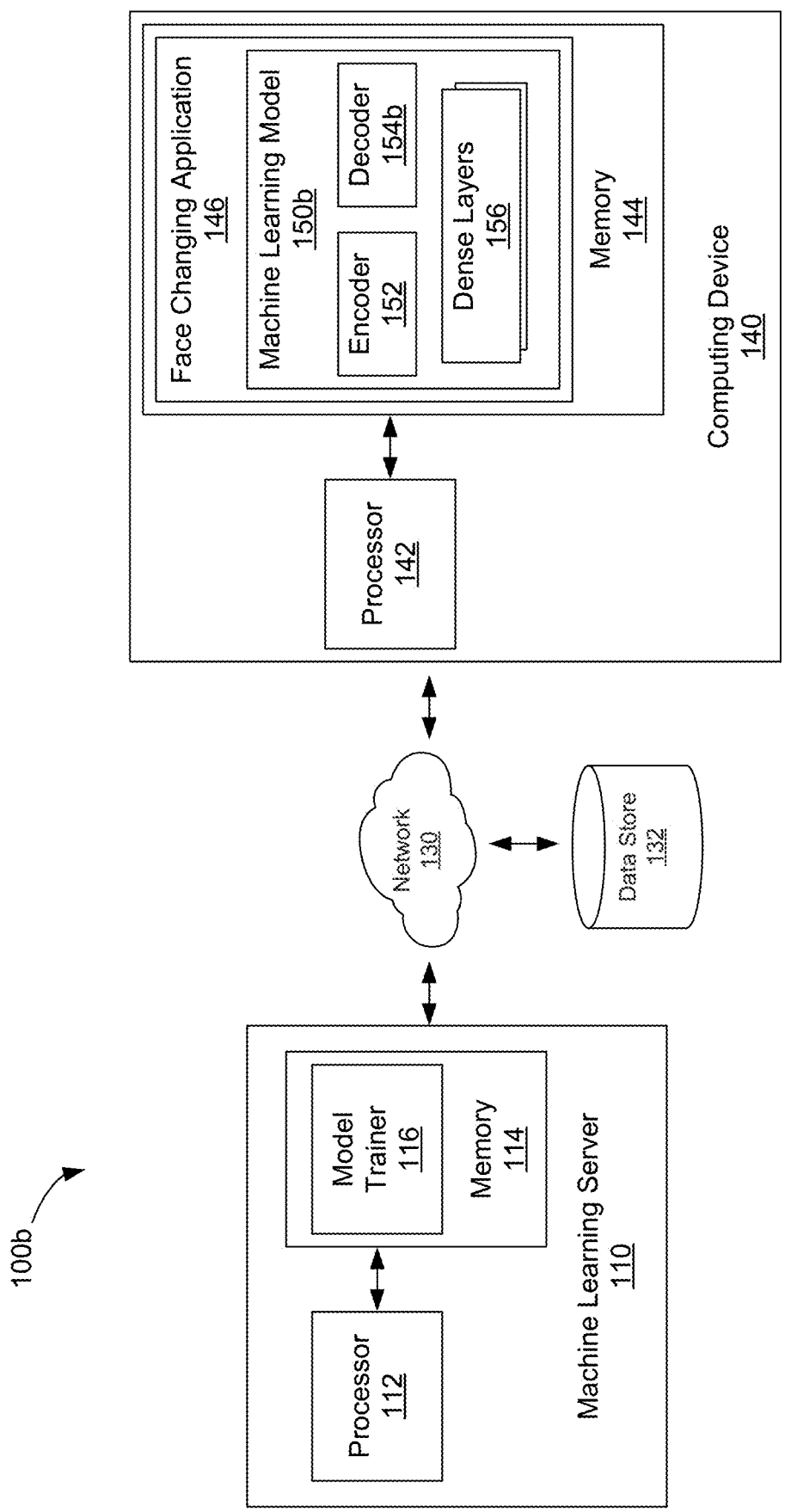
FIG. 1B is a simplified block diagram of a deep learning system according to additional embodiments.

FIG. 1B is a simplified block diagram of a system 100b according to some additional embodiments. System 100b is similar to system 100a and includes many of the same elements as system 100a. Like reference numbers in FIG. 1B represent like elements in FIG. 1a and thus descriptions of some such elements are not repeated herein for the sake of brevity. One difference between systems 100a and 100b is that system 100b includes a machine learning (ML) model 150b that is part of face changing application 146b. ML model 150b includes a single, large decoder 154b, which in turn, can output any of the facial identities system 100b can generate instead of having a separate decoder for each identity. Implementing decoder 154b as a single, large decoder can enable a smaller memory footprint relative to an architecture that uses multiple, separate decoders and can permit more efficient training.

ML model 150b enables the facial identity in an image output by decoder 154b to be selected by varying parameters that control layers within the decoder 154 and/or change the values of weights within the layers. Varying such parameters to change the facial identities in images output by decoder 154 is also referred to herein as "tuning" ML model 150b. As shown, ML model 150b includes dense layers 156 whose outputs can be directly used as the parameters, or used to generate the parameters, for tuning ML model 150b. Dense layers are sometimes also referred to as "fully-connected" layers. In some embodiments, dense layers 156 can include different sets of dense layers for each facial identity that is learned during training. In such a case, adaptive instance normalization (AdaIN) coefficients output by the dense layers for a given facial identity can be used to control convolution layers within decoder 154 so that the decoder 154 generates images including the given facial identity. AdaIN coefficients are coefficients that can be used to perform multiplications and/or additions on activations of convolution layers, which is similar to performing an affine transformation and can cause decoder 154 to generate images including different facial identities. Doing so essentially creates multiple "virtual" decoders, one for each of the different facial identities used to train ML model 150b. Although described above with respect to set(s) of dense layers, in some embodiments, a single dense layer may be used in lieu of a set of dense layers. For example, dense layers 156 can include a single set of dense layers for multiple facial identities that are learned during training, and such dense layers can output either AdaIN coefficients that control convolution layers within the decoder 154 or weight values for the convolution layers. Further details on embodiments of decoder 154b, dense layers 156 and AdaIN coefficients are set forth in U.S. Patent Publication No. 2021-0327038, entitled "Tunable Models for Changing Faces in Images", which is incorporated by reference herein in its entirety.

Figure 2:
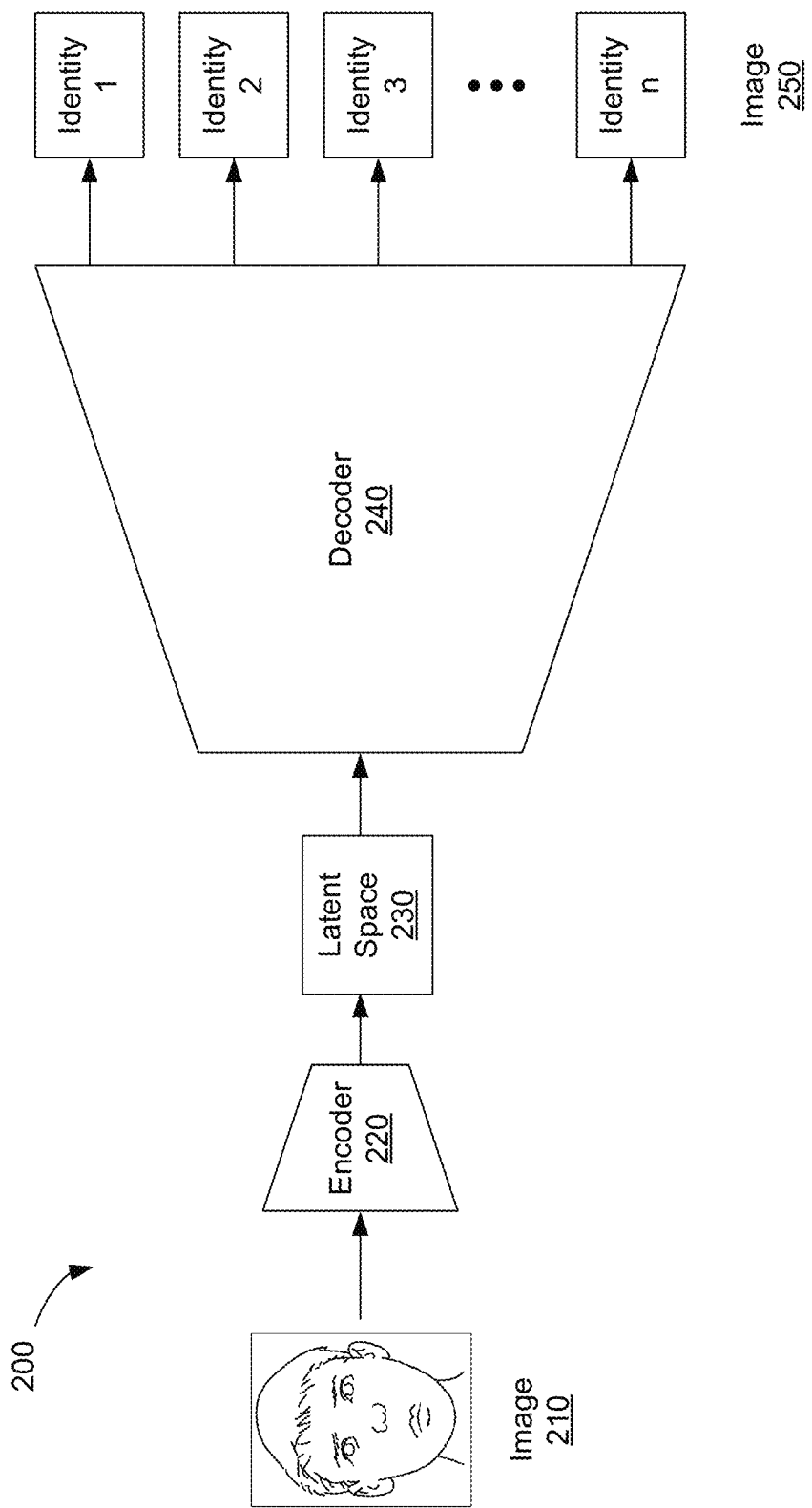
FIG. 2 is a simplified block diagram of a portion of a machine language (ML) model according to some embodiments

FIG. 2 is a simplified block diagram of a machine language (ML) model 200 according to some embodiments. ML model 200 can be representative of ML model 150a and ML model 150b shown in FIGS. 1A and 1B, respectively, and can thus be part of face changing applications 146a and 146b. As shown, ML model 200 includes an encoder 220 and a decoder 240. Decoder 240 can be implemented in a variety of different ways. In some implementations decoder 240 can include multiple, separate decoders, each of which can generate images of a different facial identity as described above with respect to decoder 154a. For example, decoder 240 could include n separate decoders, each of which is associated with a different facial identity in a set of facial identities 1 to identity n. In other implementations, decoder 240 can include one or more sets of dense layers that can generate different facial identities as described with respect to decoder 154b. For example, decoder 240 could include n sets of dense layers, each of which is associated with a different facial identity in a set of facial identities 1 to identity n.

Having decoder 240 associated with different facial identities, enables ML model 200 to generate images that include those facial identities, as well as combinations thereof, which are also referred to herein as "interpolations" of the facial identities. When ML model 200 is trained correctly, any input face can be swapped into any target face.

As shown in FIG. 2, target and source images can be encoded into a shared latent space 230. When used to transfer a performance from a source actor to a target actor, the source image is encoded and then decoded as the target while matching the performance of the source. For example, face changing application 146 can input an image 210 including a face into the ML model 200. As described, the image 210 can be, e.g., a normalized image in which landmarks of a face appearing in the image 210 have been aligned to match landmarks of a generic face with a neutral expression and the image has been cropped to a predefined size. Although a single image 210 is shown for illustrative purposes, multiple images, such as the frames of a video, may also be processed (sequentially) using the ML model

200. As shown, the encoder 220 processes the input image 210 to generate a latent space point carrying the latent space representation 230 of the image 200. Thereafter, the latent space point is input into the decoder 240, which generates an output image 250 in accordance with a desired facial identity but with the facial expression and pose of the face in the input image.

II. Multiple Encoders

As described above, given a normalized image that includes a face, encoder 152 can output an encoded representation of the normalized image, which is also referred to herein as a "latent space point" of the normalized image. The latent space point can be in the form of multi-dimensional vector that include hundreds of dimensions (and thus is sometimes referred to herein as a "latent space vector"). As a non-limiting example, in some embodiments the latent space point can be a 512 dimension vector. In some embodiments, a single encoder encodes the entire face within image 210 as a single latent space point. Other embodiments, however, can include multiple encoders each of which encodes a portion of image 210. For example, the eyes and mouth of a person can be encoded separately from the rest of the face. Such an embodiment is depicted in FIG. 3, which is a simplified block diagram of a multi-encoder system 300 according to some embodiments, which can be representative of encoder 220.

Figure 3:
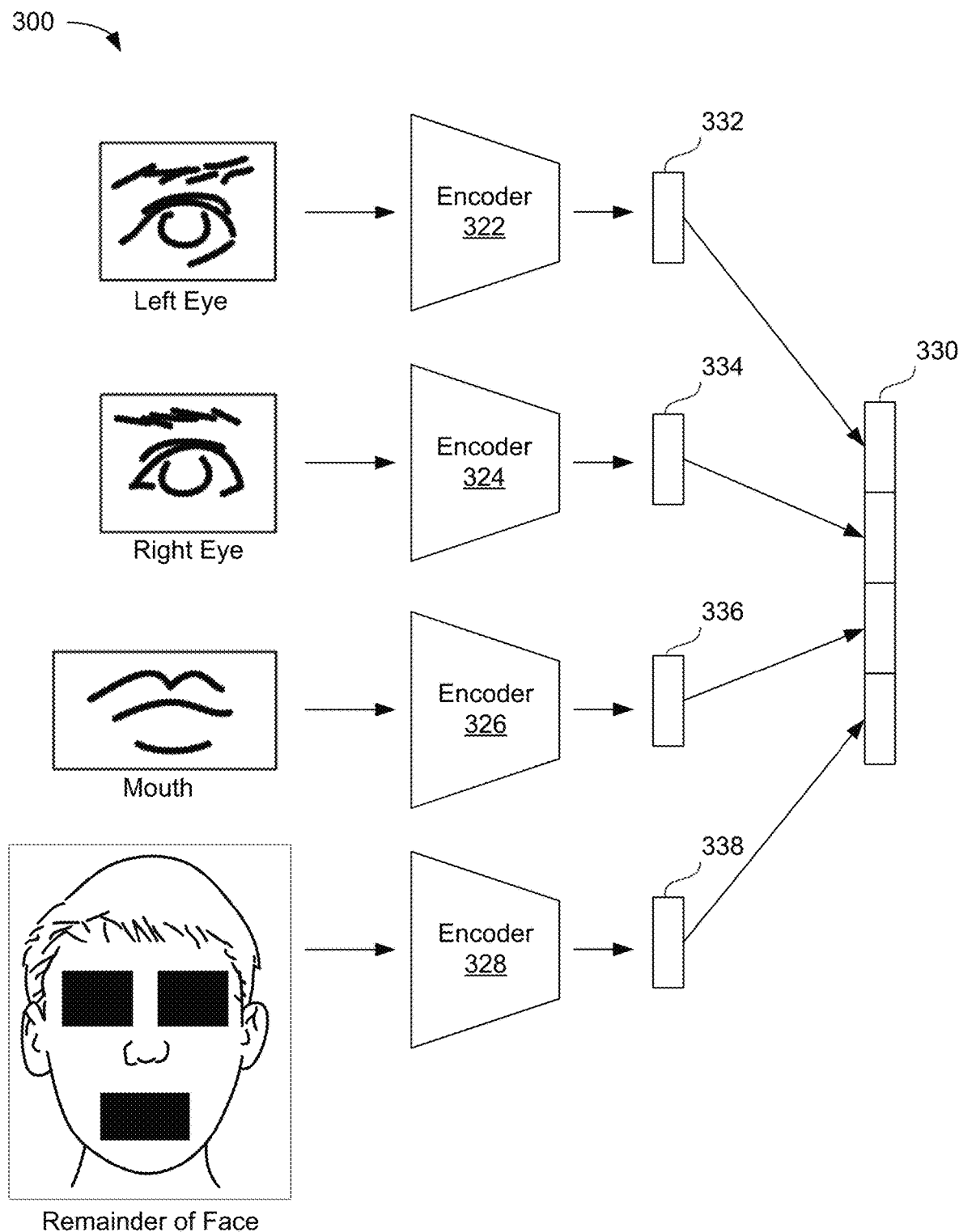
FIG. 3 is a simplified block diagram of a multi-encoder system according to some embodiments.
Figure 4:
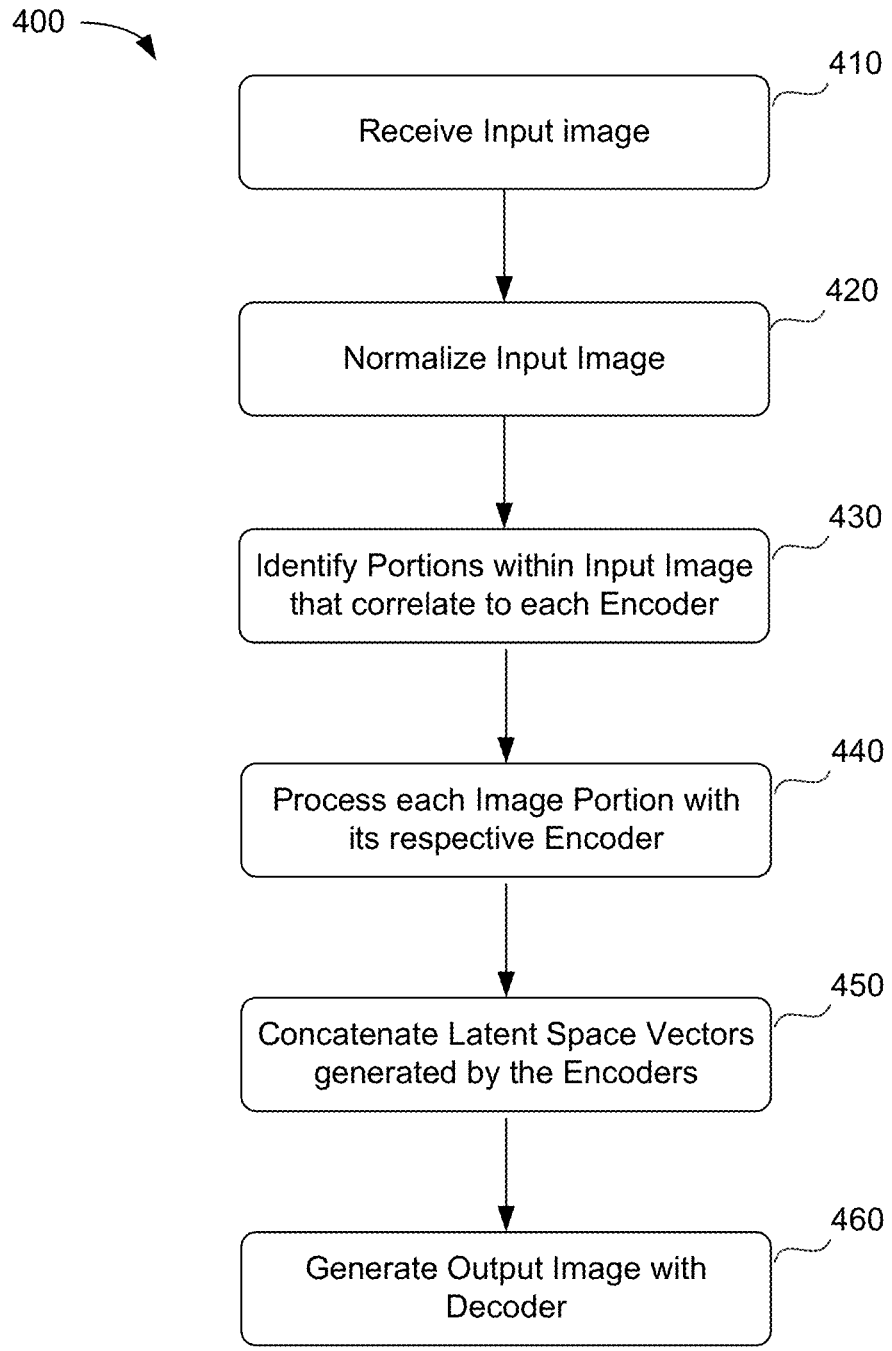
FIG. 4 is a simplified flow diagram of steps associated with a method of changing a face appearing in an image according to some embodiments.

Reference is now made to both FIG. 3 and FIG. 4, which is a simplified flow diagram of steps associated with a method 400 of changing a face appearing in an image according to some embodiments. As shown in FIG. 3, multi-encoder system 300 can include four separate encoders 322, 324, 326 and 328 where encoder 322 is trained to encode a left eye of a face in the input image, encoder 324 is trained to encode a right eye of the face in the input image, encoder 326 is trained to encode a mouth of the face of the input image and encoder 328 is trained to encode the remainder of the face in the input image. It is to be understood that the four separate encoders 322, 324, 326, 328 represent an illustrative embodiment only. In other embodiments, fewer or more than four encoders can be included in multi-encoder system 300 and individual encoders in the system can encode different portions of an input image. For example, in some embodiments a single encoder can be trained to encode both the left and right eyes.

Method 400 can be initiated when an image, such as image 210 shown in FIG. 2, and a selection of a facial identity is received by a face changing application, such as face changing application 146*a* or 146*b*, in which multi-encoder system 300 is included (FIG. 4, block 410). For example, the selected facial identity can be one of the facial identities that the ML model within face changing application 146*a* or 146*b* (e.g., ML model 150*a* or ML model 150*b*) was trained for. Alternatively, the selected facial identity could be an interpolation that combines the facial identities that the ML model was trained for. Although described with respect to a single image, the face changing application 146*a* or 146*b* can also receive a video including multiple frames that include faces and process each frame according to steps of the method 400.

Face changing application 146*a* or 146*b* can then normalize the received image (block 420). As described, any technically-feasible technique can be used to normalize the received image, such as using well-known face alignment techniques to compute an affine transformation for rotating, scaling, translating, etc. the image, and/or cropping the image to a predefined size. Face changing application 146*a* or 146*b* can then process the image to identify portions of the image (referred to herein sometimes as "image segments") that correspond to the different encoders 322, 324, 326, 328 and separate out and crop each identified portion to predetermined dimensions that are appropriate for the given decoder (block 430). The identifying, separating and cropping process can be done using any known technique for identifying information and/or facial features within an image including deep learning techniques. The predetermined dimensions (e.g., a predetermined pixel resolution) at which each portion of the image is cropped can depend on the facial features that the particular encoder associated with the cropped portion has been trained to but are generally large enough to contain the entirety of the desired facial feature. For example, in some embodiments the portions cropped for encoders 322 and 324, which have been trained on left and right eyes, respectively, can be identically sized but can be smaller than the portion cropped for encoder 326, which can be trained on a mouth.

With respect to system 300, block 430 can include identifying a portion of the input image that corresponds to a left eye and thus correlates with encoder 322, a portion of the input image that corresponds to a right eye and thus correlates with encoder 324, a portion of the input image that corresponds to a mouth and thus correlates with encoder 326 and the remainder of the face within the image that correlates to encoder 328. In some embodiments, the portion of the image that correlates to encoder 328 can be the entirety of the face within the image minus each of the portions that correlate to encoders 322, 324 and 326.

Once the different features in the images have been identified and have been separated from the image and cropped to appropriate, predetermined sizes, the different image portions can be input to their respective encoders for processing (block 440). In some embodiments, the processing at each encoder can occur simultaneously while in other embodiments it can occur sequentially or in any appropriate order. During the processing of block 440, each encoder generates a latent space point of the image portion it received from block 430. Thus, encoder 322 can output an encoded representation 332 of the left eye within the normalized image; encoder 324 can output an encoded representation 334 of the right eye within the normalized image; encoder 326 can output an encoded representation 336 of the mouth within the normalized image; and encoder 328 can output an encoded representation 338 of the remainder of the face within the normalized image.

As described, the latent space point can be a most compressed version of the normalized image portion in which favorable information has been preserved. In some embodiments, a latent space can be the output of any intermediate neural layers, such as dense or convolutional layers, that exist between an encoder and decoder. Each encoder 322, 324, 326, 328 learns to generate such an encoded representation via known training methods, such as the training techniques described in either of U.S. Pat. No. 10,902,571, entitled "Automated Image Synthesis using a Comb Neural Network Architecture" or U.S. Patent Publication No. 2021-0327038, entitled "Tunable Models for Changing Faces in Images", each of which is referenced above and incorporated herein in its entirety for all purposes. The encoded representation generated by each of the encoders 322-328 can be in the form of multi-dimensional vector that include many dimensions. As a non-limiting example, in some embodiments the encoded representation output from each of encoders 322, 324, 326, 328 can be a 128 dimension vector.

Once the different latent space points have been generated by each of the encoders 322, 324, 326, 328, the ML model can generate the overall image latent space point (e.g., latent space vector 330 shown in FIG. 3) as a concatenation of the separate latent space points 332, 334, 336, 338 from each of the separate encoder 322, 324, 326, 328, respectively (block 450). Thus, the four encoded representations 332, 334, 336, 338 equal an encoded representation 330 of the full image, and in an embodiment where each of the latent space points 322, 324, 326, 328 is a 128 dimension vector, the overall image latent space vector 330 is a 512 dimension vector. The latent space vector (latent space point) 330 generated in block 450 can then be decoded by a decoder within the ML model (e.g., decoder 240) using the techniques described above, to generate an output image that has the selected identity with the facial expression and pose of the face in the input image (block 460).

The inclusion of multiple, separate encoders in encoder system 300 can enable expressions of an output image generated by the decoder (e.g., decoder 240) in block 460 to be more faithful to the original expression in the input image in some instances than when a single encoder is employed to encode the entirety of the face within the input image.

III. Editing a Latent Space Point

As mentioned above, deep learning face swapping techniques previously known to the inventors do not allow for a director, special-effects artist or other end-user to control the output image other than controlling the identity of the image. Thus, as an example, if during production of a film or video, a performance is captured in which the source actor was looking in a different direction than the target actor is looking in the video or film being produced, each frame of the footage needs to be manually edited to change the direction of the target actor's eyes after the face swapping process has been implemented. Such manual editing can be time consuming and cost prohibitive in some instances. Some embodiments disclosed herein provide a system that can solve such problems by enabling the latent space point generated by encoder 220 of the source facial shape to be edited prior to being decoded and transformed into an image that represents the target character's face by decoder 240.

Figure 5:
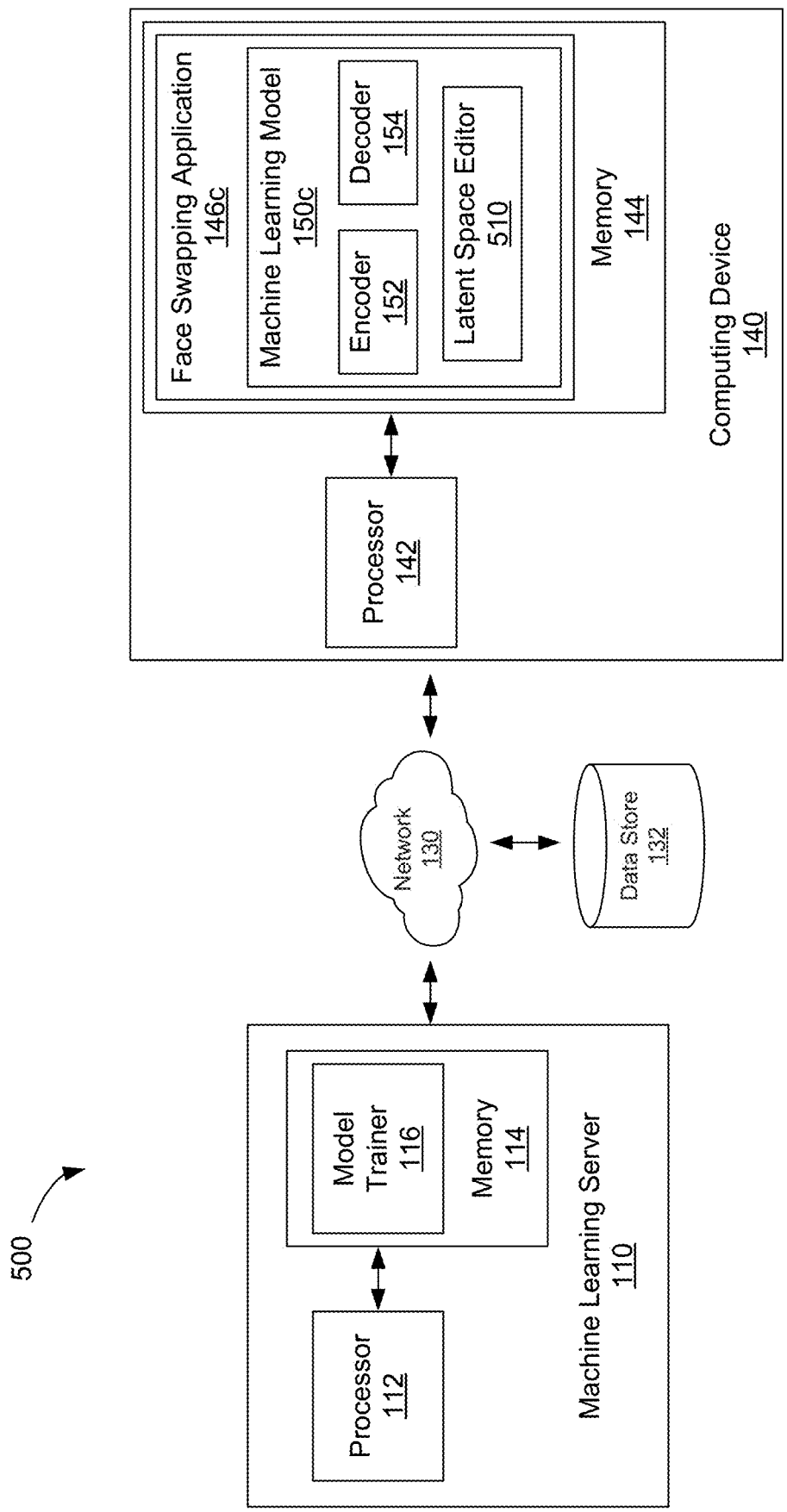
FIG. 5 is a simplified block diagram of a deep-learning system according to some embodiments.

FIG. 5 is a simplified block diagram of a deep learning system 500 according to some embodiments. System 500 can be similar to either of systems 100a or 100b discussed above and can include many of the same elements as those systems. For the sake of convenience, like reference numbers in FIG. 5 represent like elements discussed above with respect to FIGS. 1A and 1B, and thus descriptions of some such like elements are not repeated herein for the sake of brevity. One difference between system 500 and systems 100a and 100b is that system 500 includes a machine learning (ML) model 150c that includes a latent space editor 510 in addition to an encoder 152 and decoder 154. Encoder 220 and decoder 240 shown in FIG. 2 can be representative of encoder 152 and decoder 154, respectively.

Latent space editor 510 allows a user of face swapping application 146 to control certain aspects of the output image generated by decoder 154 as described in detail below. For example, in some embodiments, latent space editor 510 allows a user to control the direction in which the eyes of a target facial identity are directed in the output image. As another example, in some embodiments, latent space editor 510 allows a user to control the degree at which the mouth of a target facial identity is opened or closed in the output image.

In some embodiments, latent space editor 510 can enable an end-user to have essentially the same amount of control over the final image as can be obtained with other facial animation technologies such as technologies based meshes, blend shapes and the like.

Figure 6:
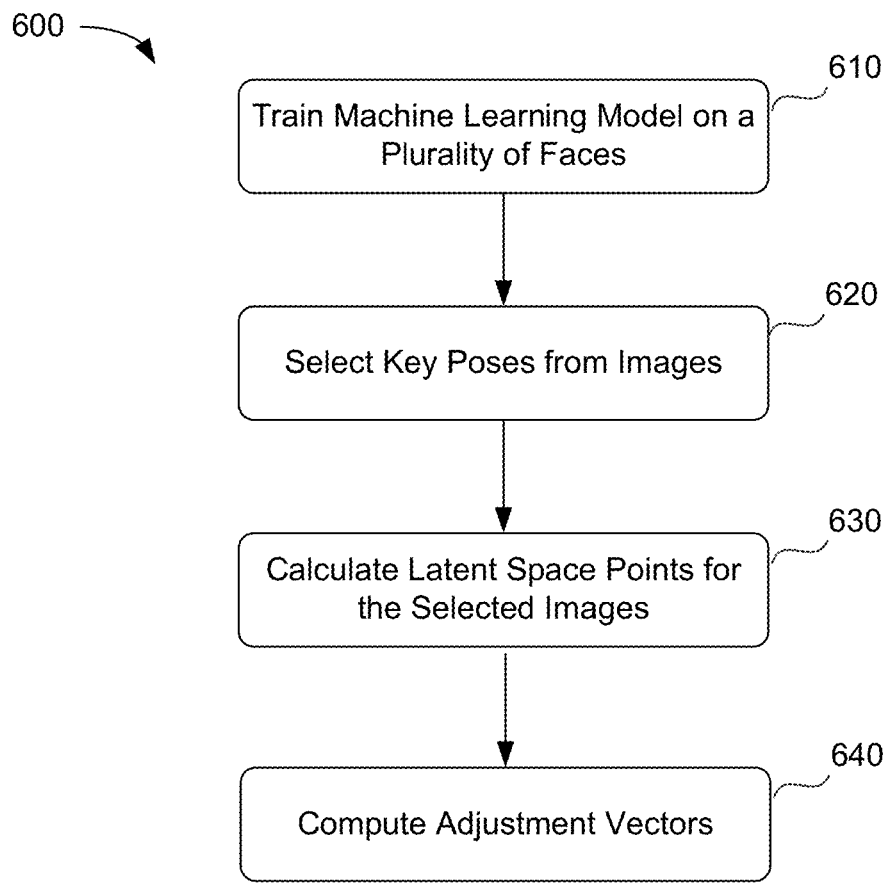
FIG. 6 is a simplified flow diagram of steps associated with a method of generating adjustment vectors that can be used to edit one or more features or aspects of a face appearing in an output image according to some embodiments.

Latent space editor 510 can be generated from one or more sets of images having particular facial expressions as set forth in FIG. 6, which is a simplified flow diagram of steps associated with a method 600 of generating adjustment vectors. The adjustment vectors generated by method 600 can be used by latent space editor 510 to edit one or more features or aspects of a face appearing in an output image according to some embodiments. As shown, method 600 can include training a neural network, including encoder 152 and decoder 154, within machine learning model 150c on a multiple variety of different identities to encourage making the shared latent space (e.g., latent space 230 shown in FIG. 2) agnostic to any particular identity (block 610). In one particular example, the neural network can be trained on between 20-40 different identities, but it is to be understood that any appropriate number of identities, including more than forty or less than twenty, can be used with a goal of the training to enable the shared latent space to be identity-agnostic.

Once the neural network has been sufficiently trained, a few key poses from images of one of these identities (or of a different identity) that exhibit the features or traits that latent space editor 510 is intended to modify are selected (block 620). The selected images can be a subset of images and identities from the set of images and identities used to train the neural network, Alternatively, as long as the network is trained to be identity-agnostic, the selected images can be images from any identity as long as facial features in the selected images exhibit the desired feature or trait. As an example, for latent space editor 510 to be able to edit the degree at which the mouth of a face in an output image is opened or closed, a first set of images can be identified in block 620 in which the mouth is opened and a second set of images can be selected in which the mouth is closed. As another example, if latent space editor 510 is to include the capability to edit the direction in which the eyes of a face in the output image are looking, images can be identified in block 620 which the eyes are looking in a particular direction. Since left is the opposite of right and up is the opposite of down, in order to generate adjustment vectors that allow the eyes to be altered in either the left/right directions as well as the up/down directions, sets of training images can be selected that include eyes looking in each of the four directions. To generate the left/right adjustment vector, a first set of images can be identified where the eyes in the images looking left and a second set where the eyes are looking right. To generate the up/down adjustment vector, a third set of images can be selected where the eyes in all the images of the third set are looking up and a fourth set of images can be selected where the eyes in all the images of the fourth set are looking down.

Any reasonable number of images can be selected in block 620 to generate the adjustment vectors. As a non-limiting example, in some embodiments for each desired characteristic or trait for which latent space editor 510 is to be trained to alter, a set of between 5-10 images that exhibit the selected characteristic or trait can be selected. In other embodiments, fewer than five images or more than ten images can be selected to train the latent space editor 510.

Next, corresponding latent space points can then be calculated for the selected images (block 630). In essence, the calculated latent space points can define a specific feature in the latent space (a specific latent direction). Canonical adjustment vectors can then be defined (block 640). In some embodiments the adjustment vectors can be defined by computing the vector between a neutral latent space point and the action specific latent space point for the selected images. For example, to produce an adjustment vector that represents an open or closed mouth, an average latent vector can be calculated from images from the set with the mouth open and an average latent vector can be calculated from images from the set with the mouth closed. The mouth open/closed adjustment vector can be calculated by subtracting these two averages. As another example, to produce an adjustment vector that represents eyes looking up or eyes looking down, an average latent vector can be calculated from images from the set with the eyes looking up and an average latent vector can be calculated from images from the set with the eyes looking down. The eyes up/down adjustment vector can be calculated by subtracting these two averages. Similarly, to produce an adjustment vector that represents eyes looking left or eyes looking right, an average latent vector can be calculated from images from the set with the eyes looking left and an average latent vector can be calculated from images from the set with the eyes looking right. The eyes left/right adjustment vector can be calculated by subtracting these two averages. In other embodiments, principal component analysis (PCA) or other techniques can be used to generate the adjustment vectors.

Given a new latent space point for a different identity where an adjustment is required, an appropriate adjustment vector out of the canonical available ones can be selected to translate that latent space point. The translated latent space point can then be fed to the decoder to yield a swapped image similar to the original one, except with the facial expression transposed onto the different identity and with desired adjustment.

Figure 7:
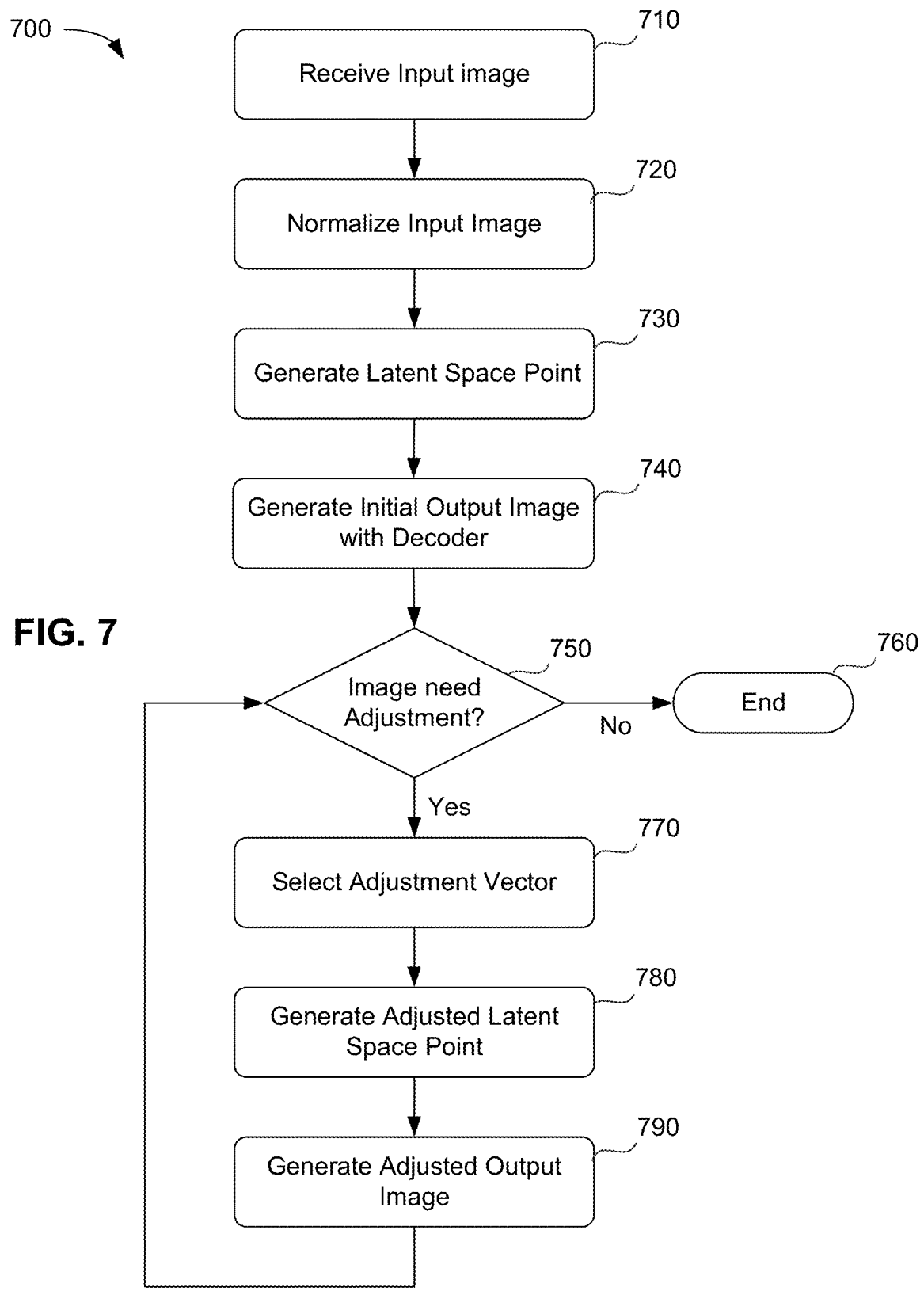
FIG. 7 is a simplified flow diagram of steps associated with a method of changing a face appearing in an image and editing one or more features of the face according to some embodiments.

FIG. 7 is a simplified flow diagram of steps associated with a method 700 of changing a face appearing in an image and editing one or more features of the face according to some embodiments. Method 700 can be initiated when an image, such as image 210 shown in FIG. 2, and a selection of a facial identity is received by a face changing application, such as face changing application 146c (FIG. 5), in which latent space editor 510 is included (FIG. 7, block 710). For example, the selected facial identity can be one of the facial identities that the ML model within the face changing application 146c (e.g., ML model 150c) was trained for. Alternatively, the selected facial identity could be an interpolation that combines the facial identities that the ML model was trained for. Although described with respect to a single image, the face changing application 146c can also receive a video including multiple frames that include faces and process each frame according to steps of the method 700.

Face changing application 146c can then normalize the received image (block 720). As described, any technically-feasible technique can be used to normalize the received image, such as using well-known face alignment techniques to compute an affine transformation for rotating, scaling, translating, etc. the image, and/or cropping the image to a predefined size. Once normalized, encoder 152 can process the normalized image and generate a latent space point representative of the image (block 730). The latent space point can then be decoded by 154c within the ML model using the techniques described above, to generate an initial output image that has the selected identity with the facial expression and pose of the face in the input image (block 740).

Depending on the desired characteristics of the output image, one or more adjustments to the image might be desired (block 750). For example, if the director of a film would prefer that the mouth in the face in the output image be opened slightly more, an adjustment to the output image can be made. If no adjustment is required, the output image can be considered finalized (block 760). If, on the other hand, adjustments are desired, an adjustment vector appropriate for the adjustment can be selected (block 770). For example, if the direction in which eyes in the initial output image need to be changed, one or both of the eye left/right or eye up/down adjustment vectors can be selected.

Next, the selected adjustment vector is applied to the latent space point representative of the initial output image to generate an adjusted latent space point (block 780). For example, using linear algebra the adjustment vector can be added to the latent space point representative of the initial output image that is generated to nudge the feature or characteristic being adjusted in the output image in the desired direction. A new, adjusted output image can then be generated by the decoder from the adjusted latent space point (block 790). The new, adjusted output image can then be reviewed and evaluated to determine whether additional adjustments are desired (block 750). Blocks 770, 780 and 790 can then be repeated as many times as necessary until the image generated by the decoder is accepted as a final output image (block 760).

As described with respect to FIGS. 6 and 7, adjustment vectors can be calculated and applied to the image as a whole in some embodiments. In embodiments that include multiple encoders, such as encoder 300 described in FIG. 3, adjustment vectors can be calculated and applied to each individual portion of the overall image generated by the separate encoders. Combining the multiple encoders 322-328 of FIG. 3 and latent space editor 510 of FIG. 5 into the same face changing application can allow for a higher degree of control over the output image than is possible when the adjustment vectors generated by the latent space editor 510 are applied to the image as a whole. For example, if the encoder in an ML model encodes the whole face as a single latent space vector, there might never be a training image in which different features of the face align in accordance with a desired alignment of the features in an output image. While the ML model may get close to the desired output all the various features of the face are essentially tangled together in the image. Because of this entanglement, edits to one facial feature by latent space editor 510 can sometimes result in unexpected and undesired alterations to other facial features. Separating different features of the face (e.g., eyes and mouth) from each other, enables latent space editor 510 to have more precise control over changing a desired facial feature in the output image without impacting other facial features that the end-user is not interested in changing.

In some embodiments, latent space editor 510 can include a user interface that enables a user to easily select, on a sliding scale, how much of a desired adjustment to the particular feature is desired. To illustrate, reference is made to FIG. 8, which is a simplified diagram depicting an example of a user interface 800 according to some embodiments along with three separate output images 810, 820 and 830 each of which has been generated from the same input image encoded by encoder 152 in which the eyes of the subject in the input image are in a neutral position looking neither left or right, i.e., looking straight.

User interface 800 can be a slider that enables a user to select on a sliding scale (e.g., from −1.0 to 1.0) a weight that will be given to a selected adjustment vector and applied by latent space editor 510 to the latent space point that represents the initial output image. Assume in FIG. 8 that an adjustment vector has been calculated as described above that can nudge the eyes of a face within an output image generated by a decoder, such as decoder 154, to the right when the vector is added to the latent space point representing the initial output image. Conversely, if the adjustment vector is subtracted from the initial output image, the eyes of the output image can be nudged to the left.

Figure 8:
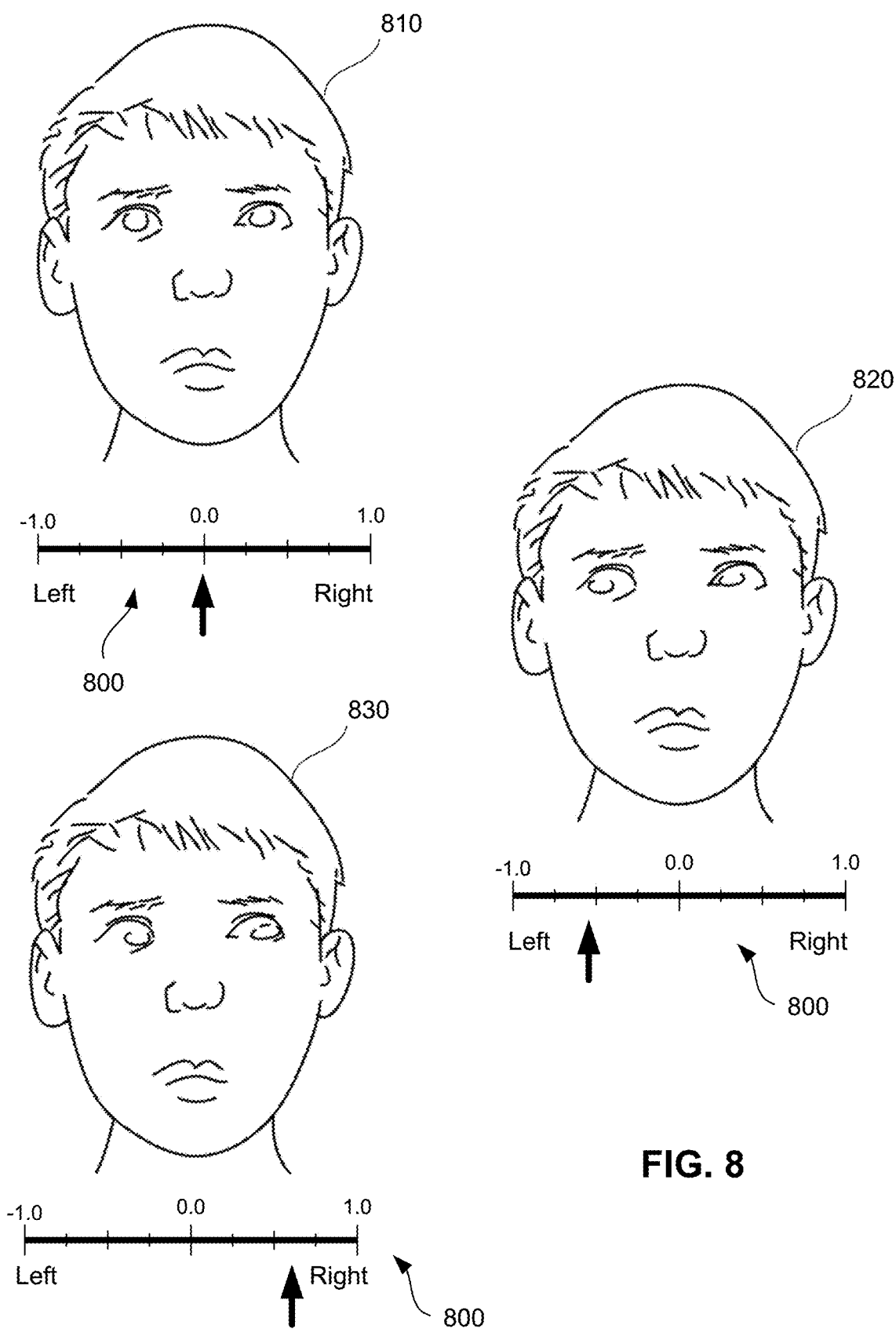
FIG. 8 is a simplified diagram depicting an example of a user interface according to some embodiments that can facilitate editing one or more features of a face generated by a deep learning system.

As shown in FIG. 8, image 810 has been decoded by decoder 154 without applying the adjustment vector to latent space point generated by the decoder from an encoded original image. That is, the weight given to the adjustment vector is 0.0. Accordingly, the eyes in an initial output image 810 are looking in the same direction as the eyes of the input image. Image 820 has been generated by decoder 154 after a negative value of the adjustment vector has been applied to an initial latent space point representative of the initial output image generated by the decoder (e.g., image 810). As seen, the adjustment vector has changed the direction of the eyes from looking straight ahead to looking left. The amount of change in left direction can be controlled by moving the slider further or less left than is depicted. Similarly, image 830 has been decoded by decoder 154 after a positive value of the adjustment vector has been applied to the initial latent space point representative of the initial output image (e.g., output image 810) changing the direction of the eyes from looking straight ahead to looking right. Again, the amount of change in right direction can be controlled by moving the slider further or less right than is depicted. As can be appreciated, the user interface 800 can include additional sliders, such as one for each adjustment vector that has been identified, to enable additional adjustments to the output image.

IV. Additional Embodiments

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and descriptions mentioned herein are incorporated by reference in their entirety for all purposes. None is admitted to be prior art Although the disclosure has been described with respect to specific embodiments, it will be appreciated that the disclosure is intended to cover all modifications and equivalents within the scope of the following claims.

What is claimed is:

1. A computer-implemented method of changing a face within an image or video frame, the method comprising:

receiving an input image that includes a face presenting a facial expression in a pose;

processing the image with a neural network encoder to generate a latent space point that is an encoded representation of the image;

decoding the latent space point to generate an initial output image in accordance with a desired facial identity but with the facial expression and pose of the face in the input image;

identifying a feature of the facial expression in the initial output image to edit;

responsive to identifying the feature of the facial expression in the initial output image to edit, applying an adjustment vector to a latent space point corresponding to the initial output image to generate an adjusted latent space point, wherein applying the adjustment vector to the latent space point comprises translating the latent space point in latent space by adding the adjustment vector to the latent space point, wherein the adjusted latent space point comprises the latent space point after it has been translated; and decoding the adjusted latent space point to generate an adjusted output image in accordance with the desired facial identity but with the facial expression and pose of the face in the input image altered in accordance with the adjustment vector.

2. The computer-implemented method of changing a face within an image or video frame set forth in claim 1 further comprising repeating the steps of applying an adjustment vector to the latent space point corresponding to the initial output image to generate an adjusted latent space point and decoding the adjusted space point to generate an adjusted output image until the adjusted output image has the desired facial expression.

3. The computer-implemented method of changing a face within an image or video frame set forth in claim 1 wherein the adjustment vector is generated from a plurality of key poses from selected images having a facial expression with a selected trait.

4. The computer-implemented method of changing a face within an image or video frame set forth in claim 1 wherein the adjustment vector is generated from a plurality of key poses from selected images having a facial expression with a selected trait, calculating latent space points for the selected images, and generating the adjustment vectors by computing differences between an average of latent space points for the selected images and a neutral latent space point.

5. The computer-implemented method of changing a face within an image or video frame set forth in claim 1 wherein the neural network is trained to be identity agnostic.

6. The computer-implemented method of changing a face within an image or video frame set forth in claim 1 wherein the input image is normalized prior to the receiving step.

7. The computer-implemented method of changing a face within an image or video frame set forth in claim 6 wherein the input image is resized to a predetermined size prior to the receiving step.

8. The computer-implemented method of changing a face within an image or video frame set forth in claim 1 further comprising allowing a user to select one or more features in the initial output image to adjust via a user interface.

9. The computer-implemented method of changing a face within an image or video frame set forth in claim 8 wherein the user interface comprises a slider that allows the user to control a weighting of the adjustment vector that is applied to the latent space point corresponding to the initial output image.

10. The computer-implemented method of changing a face within an image or video frame set forth in claim 1 further comprising incorporating the output image into one or more of a movie, a video, a video game or virtual or augmented reality content.

11. The computer-implemented method of changing a face within an image or video frame set forth in claim 1 wherein processing the input image with the neural network encoder to generate a latent space point that is an encoded representation of the image comprises:
   separately encoding different portions of the image by, for each separately encoded portion, generating a latent space point of the portion, thereby generating a plurality of multi-dimensional vectors where each multi-dimensional vector is an encoded representation of a different portion of the input image; and
   concatenating the plurality of multi-dimensional vectors into a combined vector that is the latent space point which, in turn, is an encoded representation of the image.

12. The computer-implemented method of changing a face within an image or video frame set forth in claim 11 wherein:
   identifying a feature of the facial expression in the initial output image to edit corresponds to identifying at least one of the separately encoded image portions, and
   wherein applying an adjustment vector comprises selecting an adjustment vector that corresponds to the at least one identified separately encoded image portion.

13. The computer-implemented method of changing a face within an image or video frame set forth in claim 12 wherein decoding the adjusted latent space point to generate an adjusted output image alters only a portion of the output image that corresponds to the identified feature.

14. The computer-implemented method of changing a face within an image or video frame set forth in claim 1 wherein the adjustment vectors are latent space vectors generated by a mathematical operation on a plurality of latent space vectors corresponding to various encoded facial expressions.

15. The computer-implemented method of changing a face within an image or video frame set forth in claim 1 wherein the adjustment vectors are latent space vectors generated by averaging latent space vectors corresponding to various encoded facial expressions.

16. A system for changing a face within an output image or video frame, the system comprising:
   a memory storing a plurality of computer-readable instructions; and
   one or more processors operable to execute the computer-readable instructions and cause the system to:
   receive an input image that includes a face presenting a facial expression in a pose;
   process the image with a neural network encoder to generate a latent space point that is an encoded representation of the image;
   decode the latent space point to generate an initial output image in accordance with a desired facial identity but with the facial expression and pose of the face in the input image;
   identify a feature of the facial expression in the initial output image to edit;
   apply an adjustment vector to a latent space point corresponding to the initial output image to generate an adjusted latent space point, in response to identifying the feature of the facial expression in the initial output image to edit, wherein applying the adjustment vector to the latent space point comprises translating the latent space point in latent space by adding the adjustment vector to the latent space point, wherein the adjusted latent space point comprises the latent space point after it has been translated; and
   decode the adjusted latent space point to generate an adjusted output image in accordance with the desired facial identity but with the facial expression and pose of the face in the input image altered in accordance with the adjustment vector.

17. The system set forth in claim 16 wherein the plurality of computer readable instructions further comprise instructions to cause the system to repeat the steps of: (i) applying an adjustment vector to the latent space point corresponding to the initial output image to generate an adjusted latent space point and (ii) decoding the adjusted space point to generate an adjusted output image until the adjusted output image has the desired facial expression.

18. The system set forth in claim 17 wherein the adjustment vector is generated from a plurality of key poses from selected images having a facial expression with a selected trait.

19. The system set forth in claim 16 wherein the neural network is trained to be identity agnostic.

20. The system set forth in claim 16 wherein the input image is normalized and resized prior to the receiving step.

21. A non-transitory computer-readable memory comprising a plurality of computer-readable instructions that, when executed by one or more processors, cause the one or more processors to:
   receive an input image that includes a face presenting a facial expression in a pose;
   process the image with a neural network encoder to generate a latent space point that is an encoded representation of the image;
   decode the latent space point to generate an initial output image in accordance with a desired facial identity but with the facial expression and pose of the face in the input image;
   identify a feature of the facial expression in the initial output image to edit;
   apply an adjustment vector to a latent space point corresponding to the initial output image to generate an adjusted latent space point, in response to identifying the feature of the facial expression in the initial output image to edit, wherein applying the adjustment vector to the latent space point comprises translating the latent space point in latent space by adding the adjustment vector to the latent space point, wherein the adjusted latent space point comprises the latent space point after it has been translated; and
   decode the adjusted latent space point to generate an adjusted output image in accordance with the desired facial identity but with the facial expression and pose of the face in the input image altered in accordance with the adjustment vector.

22. The non-transitory computer-readable memory set forth in claim 21 comprising additional computer-readable instructions that, when executed by one or more processors, cause the one or more processors to repeat the steps of: (i) applying an adjustment vector to the latent space point corresponding to the initial output image to generate an adjusted latent space point, and (ii) decoding the adjusted space point to generate an adjusted output image until the adjusted output image has the desired facial expression.

* * * * *